United States Patent
Dong et al.

(10) Patent No.: US 8,126,031 B2
(45) Date of Patent: Feb. 28, 2012

(54) TIME-TRACKING MANAGEMENT OF DEMODULATION ELEMENTS IN A RECEIVE DIVERSITY ENABLED RAKE RECEIVER

(75) Inventors: Brian Dong, Cambridge, MA (US); Javad Razavilar, San Diego, CA (US); Manini S. Shah, San Diego, CA (US); Nathaniel Chittenden, Sunnyvale, CA (US); Valibabu Saladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 881 days.

(21) Appl. No.: 11/834,685

(22) Filed: Aug. 7, 2007

(65) Prior Publication Data
US 2009/0041093 A1 Feb. 12, 2009

(51) Int. Cl.
*H04B 1/00* (2006.01)
*H04B 1/10* (2006.01)
*H04B 7/216* (2006.01)
*H04L 7/00* (2006.01)

(52) U.S. Cl. ........ 375/148; 375/130; 375/140; 375/144; 375/147; 375/349; 375/355; 370/335; 370/342; 455/101; 455/132

(58) Field of Classification Search .................. 375/130, 375/142–15, 260, 347, 355; 370/335, 342, 370/345, 351; 455/434
See application file for complete search history.

(56) References Cited

U.S. PATENT DOCUMENTS

| | | | |
|---|---|---|---|
| 6,731,676 B2 * | 5/2004 | Rick et al. ...................... | 375/148 |
| 6,791,964 B1 | 9/2004 | Hwang et al. | |
| 7,031,368 B1 | 4/2006 | Maruta et al. | |
| 2003/0128745 A1 * | 7/2003 | Sourour et al. ............... | 375/147 |
| 2004/0253934 A1 * | 12/2004 | Ryu et al. ...................... | 455/101 |
| 2005/0232340 A1 * | 10/2005 | Ye et al. ........................ | 375/148 |
| 2008/0075216 A1 * | 3/2008 | Li et al. ......................... | 375/355 |
| 2009/0073956 A1 * | 3/2009 | Tamura ......................... | 370/351 |

FOREIGN PATENT DOCUMENTS

| | | |
|---|---|---|
| EP | 0582233 A1 | 2/1994 |
| EP | 1207583 A2 | 5/2002 |
| KR | 20000046032 A | 7/2000 |
| KR | 20010101786 | 11/2001 |
| KR | 20030061404 | 7/2003 |

OTHER PUBLICATIONS

International Search Report—PCT/US08/072436—International Search Authority—European Patent Office—Nov. 21, 2008.
Written Opinion—PCT/US08/072436—International Search Authority—European Patent Office—Nov. 21, 2008.

* cited by examiner

*Primary Examiner* — Khanh C Tran
*Assistant Examiner* — Eboni Hughes
(74) *Attorney, Agent, or Firm* — Kevin T. Cheatham (57) ABSTRACT

A rake receiver comprises a plurality of receive antennas and a processing system. Each receive antenna has a plurality of demodulation elements. The processing system is configured to assign a plurality of demodulation elements from a plurality of receive antennas to a multipath group, assign the multipath group to a multipath signal, and independently adjust a time delay value of each demodulation element in the multipath group to correspond to a local time delay of the multipath signal at the corresponding receive antenna.

40 Claims, 4 Drawing Sheets

TIME-TRACKING MANAGEMENT OF DEMODULATION ELEMENTS IN A RECEIVE DIVERSITY ENABLED RAKE RECEIVER

BACKGROUND

1. Field

The subject technology generally relates to wireless communication and, in particular, relates to time-tracking management of demodulation elements in a receive diversity enabled rake receiver.

2. Background

Synchronization between a transmitter and a receiver is important in order for data to be transmitted quickly and successfully. One method for achieving synchronization in communication systems is the use of a pilot channel, a signal that both a transmitter and a receiver know a priori. In code division multiplex access ("CDMA") systems, for example, this pilot is a pseudo-random noise ("PN") sequence.

SUMMARY

According to one aspect of the subject technology, a rake receiver comprises a plurality of receive antennas and a processing system. Each receive antenna has a plurality of demodulation elements, sometimes referred to as "fingers." The processing system is configured to assign a plurality of demodulation elements from a plurality of receive antennas to a multipath group, assign the multipath group to a multipath signal, and independently adjust a time delay value of each demodulation element in the multipath group to correspond to a local time delay of the multipath signal at the corresponding receive antenna.

According to another aspect of the subject technology, a rake receiver comprises a plurality of receive antennas and a processing system. Each receive antenna has a plurality of demodulation elements. The processing system is configured to assign one demodulation element from each receive antenna to a multipath group, assign the multipath group to a multipath signal, and independently adjust a time delay value of each demodulation element in the multipath group to correspond to a local time delay of the multipath signal at the corresponding receive antenna.

According to a further aspect of the subject technology, a method of managing time-tracking for a rake receiver is provided. The rake receiver has a plurality of receive antennas. Each receive antenna has a plurality of demodulation elements. The method comprises the steps of assigning a plurality of demodulation elements from a plurality of receive antennas to a multipath group, assigning the multipath group to a multipath signal, and independently adjusting a time delay value of each demodulation element in the multipath group to correspond to a local time delay of the multipath signal at the corresponding receive antenna.

According to yet another aspect of the subject technology, a receiver system comprises a plurality of receive antennas. Each receive antenna has a plurality of demodulation elements. The receiver system further comprises means for assigning a plurality of demodulation elements from a plurality of receive antennas to a multipath group, means for assigning the multipath group to a multipath signal, and means for independently adjusting a time delay value of each demodulation element in the multipath group to correspond to a local time delay of the multipath signal at the corresponding receive antenna.

According to yet another aspect of the subject technology, a machine-readable medium embodies a method for managing time-tracking for a rake receiver having a plurality of receive antennas. Each receive antenna has a plurality of demodulation elements. The method comprises the steps of assigning a plurality of demodulation elements from a plurality of receive antennas to a multipath group, assigning the multipath group to a multipath signal, and independently adjusting a time delay value of each demodulation element in the multipath group to correspond to a local time delay of the multipath signal at the corresponding receive antenna.

It is understood that other configurations will become readily apparent to those skilled in the art from the following detailed description, wherein it is shown and described only various configurations by way of illustration. As will be realized, the teachings herein may be extended to other and different configurations and its several details are capable of modification in various other respects, all without departing from the scope of the present disclosure. Accordingly, the drawings and detailed description are to be regarded as illustrative in nature and not as restrictive.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology.

Figure 1:
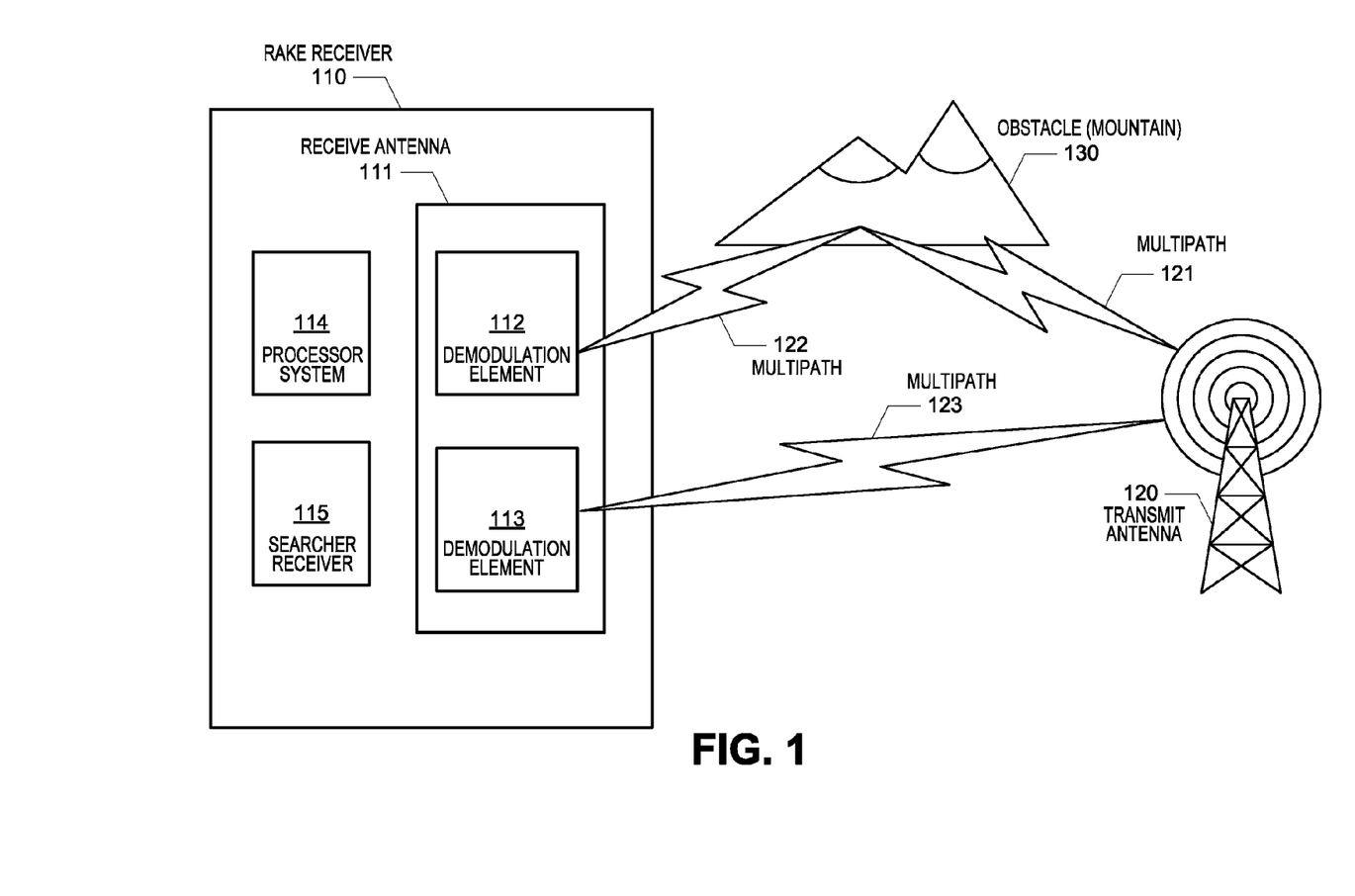
FIG. 1 is a block diagram illustrating an example of a rake receiver with one antenna, according to one aspect of the subject technology.

FIG. 1 illustrates an example of a rake receiver 110 operating in a multipath environment in accordance with one aspect of the subject technology. Multipath environments occur when multiple copies of a signal arrive at a location at slightly different times. For example, in FIG. 1, a transmit antenna 120 transmits a CDMA signal omnidirectionally. The CDMA signal includes a pilot channel known to both transmit antenna 120 and rake receiver 110 a priori. This pilot is a pseudo-random noise ("PN") sequence. One copy of the signal, multipath 123, proceeds directly from transmit antenna 120 to rake receiver 110. Another copy 121 of the signal is redirected by an object, such as mountains 130, towards rake receiver 110 (i.e., as multipath 122). PN sequences have favorable auto and cross correlation properties, inasmuch as time-shifted versions of the same sequence have very little correlation with each other, and distinct PN sequences have very little correlation with each other. To take advantage of the multipath environment, rake receiver 110 includes an antenna 111 with two demodulation elements 112 and 113. Each demodulation element is assigned to track and receive a different multipath (e.g., demodulation element 112 tracks multipath 122, demodulation element 113 tracks multipath 123).

Before the distinct paths can be demodulated, the relative arrival times (or offsets) of the paths in the received signal are first determined. To assign demodulation elements to multipaths, rake receiver 110 may include a searcher receiver 115. Searcher receiver 115 scans the time domain of a channel to determine the existence, the location in the time domain, and the relative signal strengths of signals in the multiple path environment. Searcher receiver 115 evaluates a sequence of multipaths to measure the energy received at each multipath. Based upon this measurement, searcher receiver 115 may assign demodulation elements 112 and 113 to the various multipaths. For example, according to one aspect of the subject technology, if the multipath meets some pre-determined criteria for assignment (e.g., the energy associated with a multipath exceeds a certain threshold, the position of the multipath in the time domain is sufficiently close or distant to another multipath in the time domain, etc.), one of the demodulation elements 112 and 113 may be assigned a time delay value corresponding to that multipath. Other criteria, not necessarily related to the multipaths, may also be used to assign demodulation elements to multipaths.

According to one aspect of the subject technology, searcher receiver 115 provides information allowing the demodulation elements to track the best multipath signals available on differing paths. For example, if three different multipaths were available to a rake receiver with only two demodulation elements, searcher receiver 115 may choose the two strongest multipaths to assign to the two demodulation elements. Alternatively, searcher receiver 115 may use alternative criteria for assignment to determine which multipaths to be used for assignment (e.g., which two of three available multipaths to assign), and which particular multipath to assign to which particular demodulation element.

Each demodulation element, once assigned to a multipath, tracks that multipath as it moves in time (e.g., as the time delay value corresponding to that multipath varies). The time delay value can be envisioned as having units of PN offset. At any given time, the rake receiver 110 receives a variety of signals from a transmit antenna 120, each of which has traveled a different path and may have a different delay from the others. The signal of transmit antenna 120 is modulated by a PN sequence, a copy of which is locally generated or stored at rake receiver 110. Rake receiver 110 utilizes the local copy of the PN sequence to individually demodulate each multipath signal, where the PN sequence is offset by an amount corresponding to the time delay value of the multipath. The multipath signal received by each demodulation element is then demodulated and summed by processor system 114. Processor system 114 determines the time delay of each multipath using the pilot channel, then aligns and combines them.

According to one aspect of the subject technology, processor system 114 may comprise one or more processors. The processors may be implemented with general purpose processors and volatile or non-volatile memory for storing data and instructions for software programs. The software programs, which may be stored in the memory, may be used by the general purpose processors to manage time-tracking for a rake receiver, as well as provide other communication and processing functions. The software programs may also provide an interface to the general purpose processor for various user interface devices, such as a display and a keypad. The processors may also include a digital signal processor ("DSP") with an embedded software layer to offload various signal processing functions, such as demodulation and spread-spectrum processing. Alternatively, the processors may be implemented with one or more application specific processors. The manner in which the processors are implemented will depend on the particular application and the design constraints imposed on the overall system. Those skilled in the art will recognize the interchangeability of hardware, firmware, and software configurations under these circumstances, and how best to implement the described functionality for each particular application.

Over time, multipath can vary in time to earlier or later offsets as the path distances each multipath signal travels are changed, either by the movement of rake receiver 110, or a change in the environment in which it is operating (e.g., movement of the reflecting obstacles). Each demodulation element is configured to track these variations in the multipath signal to which it is assigned. For example, demodulation element 112 continually evaluates the signal strength received at its current time delay value and at adjacent time delay values, and adjusts its time delay value as necessary to maintain the strongest signal.

Figure 2:
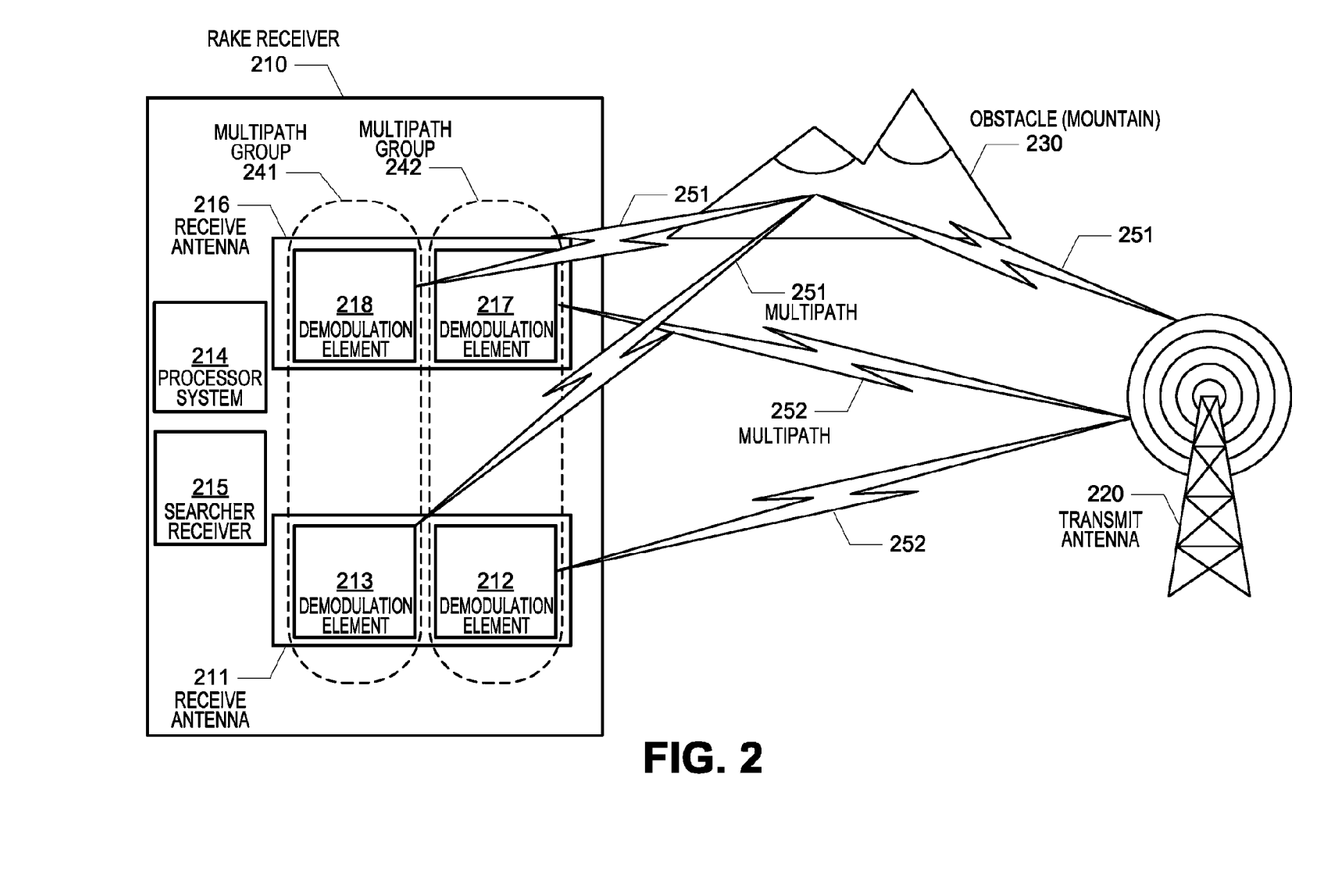
FIG. 2 is a block diagram illustrating an example of a rake receiver with two antennas, according to one aspect of the subject technology.

To provide receive diversity, many rake receivers are provided with multiple antennas. One such rake receiver is illustrated in FIG. 2, in accordance with one aspect of the subject technology. Rake receiver 210 includes two receive antennas 211 and 216. Each receive antenna includes two demodulation elements: antenna 211 includes demodulation elements 212 and 213, and antenna 216 includes demodulation elements 217 and 218. Rake receiver 210 further includes a processor system 214 and a searcher receiver 215.

In accordance with one aspect of the subject technology, the demodulation elements of the multi-antenna rake receiver 210 are organized into multipath groups, by assigning one demodulation element from each antenna to a multipath group. For example, demodulation elements 213 and 218 are assigned to multipath group 241, and demodulation elements 212 and 217 are assigned to multipath group 242. Each multipath group is then assigned by searcher receiver 215 to a different multipath, in a similar manner to that explained above with reference to FIG. 1. For example, the signal path that proceeds directly from transmit antenna 220 to rake receiver 210, labeled as multipath 252, is assigned to multipath group 242, and the signal path that is reflected from obstacle 230, labeled as multipath 251, is assigned to multipath group 241. The demodulation elements of a multipath group are each assigned by searcher receiver 215 a time delay value which corresponds to the time delay of the assigned multipath. For example, searcher receiver 215 may assign a time delay value of 2000 nanoseconds to the demodulation elements of multipath group 241, and a time delay value of 1000 nanoseconds to the demodulation elements of multipath group 242.

According to another aspect of the subject technology, the demodulation elements of a rake receiver may be organized into multipath groups in any number of ways. For example, a multipath group may include only one demodulation element from each antenna. In another example, a multipath group may include multiple demodulation elements from any one of the antennas. In yet another example, a multipath group may include multiple demodulation elements from several different antennas (e.g., 3 from one antenna, 3 from another antenna). In yet another example, a multipath group may include different numbers of demodulation elements from different antennas (e.g., 2 from a first antenna, 2 from a second and 1 from a third; 4 from a first antenna, 3 from a second, and 3 from a third, etc.), or different numbers of demodulation elements from each antenna (e.g., 3 from a first antenna, 2 from a second, and 1 from a third; 5 from a first antenna, 2 from a second, 3 from a third, etc.). As will be understood by those of skill in the art, demodulation elements from a plurality of antennas may be assigned to multipath groups in any configuration.

The multipath signal received by one demodulation element may be very slightly offset from the multipath signal received by another demodulation element in the same multipath group. Therefore, in accordance with one aspect of the subject technology, each demodulation element is configured to independently track the multipath signal assigned to its multipath group. In this regard, after searcher receiver 215 has assigned the same initial time delay value to both demodulation elements 218 and 213 of multipath group 241, each demodulation element continually evaluates the local signal strength (i.e., the signal strength received at the corresponding antenna) at its current time delay value and at adjacent time delay values, and adjusts its time delay value to the local time delay as necessary to maintain the strongest signal. Local time delays may correspond to the time delay of a multipath signal tracked by a demodulation element at a corresponding antenna. By configuring the multipath groups to allow independent tracking of local time delays at each demodulation element a very strong demodulated and combined signal can be maintained in many complicated multipath environments.

Multipath signals may increase and decrease in signal strength, especially if the receiver is moving through a multipath environment, and the multipaths may further have time delays that vary. Accordingly, in some environments, two different multipaths may start out with different time delays, but may over time have time delays that cross one another. For example, multipath 251 may start with a time delay of 2000 nanoseconds, and multipath 252 with a time delay of 1000 nanoseconds, but over time, the time delay of multipath 251 may decrease, while the time delay of multipath 252 increases. At some point during this process, the time delays of multipaths 251 and 252 may be approximately the same delay of 1500 nanoseconds (i.e., as they cross). Accordingly, a demodulation element assigned to one multipath, which is constantly adjusting its time delay value to follow that multipath, may accidentally follow the other multipath after the two multipaths cross. Accordingly, allowing demodulation elements within a multipath group to independently track multipaths may result in demodulation elements within the same multipath group wandering onto different multipath signals. Such an occurrence could significantly degrade the performance of rake receiver 210, as the signals would become increasingly difficult to demodulate and combine.

Accordingly, in one aspect of the subject technology, to ensure that different demodulation elements within a single multipath group do not accidentally track different multipath signals, processor system 214 periodically compares the time delay values for the demodulation elements within a multipath group to determine whether the difference between the time delay values has exceeded a predetermined threshold. If the difference exceeds the threshold, the processor system selects one of the demodulation elements and adjusts its time delay value to be closer to the time delay value of the other demodulation element.

For example, in the present exemplary aspect, both demodulation elements 213 and 218 of multipath group 241 are assigned to multipath 251. Initially, searcher receiver 215 assigns a time delay value of 2000 nanoseconds to demodulation element 213 and demodulation element 218. As the time delay of multipath 251 varies over time towards 1500 nanoseconds, as multipath 252 does the same, demodulation element 213 may begin tracking multipath 252, while demodulation element 218 continues to track multipath 251. As multipath 251 and 252 drift apart again (i.e., as their time delays diverge), the difference in the time delay values of demodulation elements 213 and 218 may increase. Processor system 215 can continuously evaluate the difference between the time delay values of the two demodulation elements, and when it exceeds a certain predetermined threshold, such as, for example, 200 nanoseconds, processor system 214 is configured to adjust the time delay value of one of the demodulation elements to be closer to the time delay value of the other demodulation element.

According to one aspect of the subject technology, the demodulation element that processor system 214 chooses to adjust is determined based upon the relative signal strengths for the multipath signals tracked by demodulation elements 213 and 218. The time delay value of the demodulation element whose multipath has a weaker signal is adjusted to be closer to the time delay value of the demodulation element whose multipath has a stronger signal.

According to one aspect of the subject technology, the adjustment of the time delay value of the selected demodulation element can be accomplished by "bumping" the time delay value towards the value of the other demodulation element by a predetermined amount. This bumping allows the demodulation element to "walk" back towards the proper multipath, without requiring the demodulation element to be re-initialized.

For example, if demodulation element 218 has a time delay value of 1700 nanoseconds, and demodulation element 218 has a time delay value of 1400 nanoseconds, processor system 214 can analyze the difference of 300 nanoseconds between their time delay values, and determine that it exceeds the predetermined threshold of 200 nanoseconds. Accordingly, processor system 214 can determine which demodulation element currently enjoys a higher signal strength, for example, demodulation element 218, and can proceed to adjust the time delay value of demodulation element 213. To do so, processor system 214 can increment the time delay value for demodulation element 213 by a predetermined value, such as 150 nanoseconds, towards the time delay value of demodulation element 218. In this manner, demodulation element 213 can be left with a time delay value of 1550 nanoseconds. After being adjusted in this fashion, demodulation element 213 can continue to operate as outlined above, tracking the multipath to which it had been assigned by evaluating the signal strength received at its current time delay value and at adjacent time delay values, and adjusting its time delay value as necessary to maintain the strongest signal. Thus, after being bumped to a time delay value of 1550 nanoseconds, demodulation element 213 can continue to "walk" towards the multipath being tracked by demodulation element 218.

According to one aspect of the subject technology, the adjustment of the time delay value of the selected demodulation element can be accomplished by "slamming" the time delay value of one demodulation element to a same time delay value as the other demodulation element in the same multipath group. This can be done either by re-initializing the demodulation element, or by incrementing the time delay value of the demodulation element by the exact amount of the measured difference between the two demodulation elements.

According to one aspect of the subject technology, the predetermined threshold for tolerable differences in time delay values between two demodulation elements may be any value, and is not limited to the particular values in the exemplary aspects discussed above. Moreover, the predetermined amount by which the time delay value of a demodulation element is bumped may be any value, including the same value as the measured difference between two demodulation elements, some fraction of that difference (e.g., ½, ⅔, ¾, etc.), or any other suitable amount.

Figure 3:
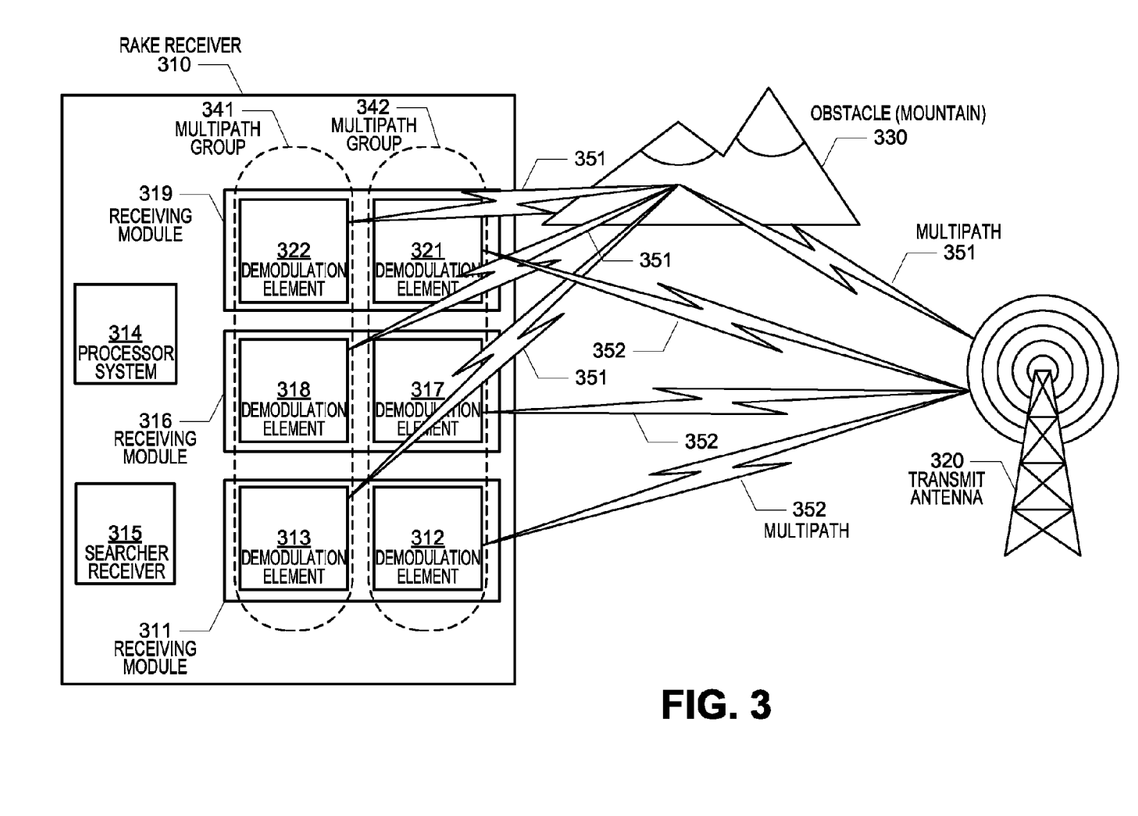
FIG. 3 is a block diagram illustrating an example of a rake receiver with three antennas, according to one aspect of the subject technology.

According to one aspect of the subject technology, the method of independently tracking time delay values with demodulation elements in the same multipath group is not limited to rake receivers with just two antennas. Rather, the method may be applied to rake receivers with any number of antennas, as will be immediately understood by those of skill in the art. For example, FIG. 3 illustrates a rake receiver 310 with three receiving modules. Each receiving module includes two demodulation modules: receiving module 311 includes demodulation modules 312 and 313, receiving module 316 includes demodulation modules 317 and 318, and receiving module 319 includes demodulation modules 321 and 322. Rake receiver 310 further includes processing module 314 and may include a searcher receiver module 315.

In accordance with one aspect of the subject technology, the demodulation module of the multi-antenna rake receiver 310 are organized into multipath groups, by assigning one demodulation module from each receiving module to a multipath group. For example, demodulation modules 313, 318 and 322 are assigned to multipath group 341, and demodulation modules 312, 317 and 321 are assigned to multipath group 342. Each multipath group is then assigned by searcher receiver module 315 to a different multipath, in a similar manner to that explained above with reference to FIGS. 1 and 2. For example, the signal path that proceeds directly from transmit antenna 320 to rake receiver 310, labeled as multipath 352, is assigned to multipath group 342, and the signal path that is reflected from obstacle 330, labeled as multipath 351, is assigned to multipath group 341.

In accordance with one aspect of the subject technology, where a rake receiver includes three antennas, as in FIG. 3, the step of comparing differences between time delay values in demodulation modules within a multipath group may be done by comparing the time delay values of all demodulation modules in a multipath group, selecting the demodulation module with the strongest signal, and adjusting any demodulation modules within the multipath group that have a difference from the selected demodulation module of more than the predetermined threshold amount (either by bumping or slamming). Alternatively, processing module 314 may compare any two of the there demodulation modules in a single multipath group and bump or slam the weaker towards the stronger.

While the foregoing exemplary aspects have been described with reference to rake receivers with antennas having only two demodulation elements each, configurations of the subject technology are not limited to such an arrangement. Rather, as will be understood by those of skill in the art, the subject technology has application to rake receivers with each antenna having any number of demodulation elements (e.g., a first antenna having two demodulation elements, a second antenna having three, a third antenna having five, etc.). Additionally, the subject technology does not require each antenna in a rake receiver to have the same number of demodulation elements. Rather, rake receivers with antennas having varying numbers of demodulation elements can be similarly configured to organize demodulation elements into multipath groups of different sizes and configurations, as will be readily apparent to those of skill in the art.

Figure 4:
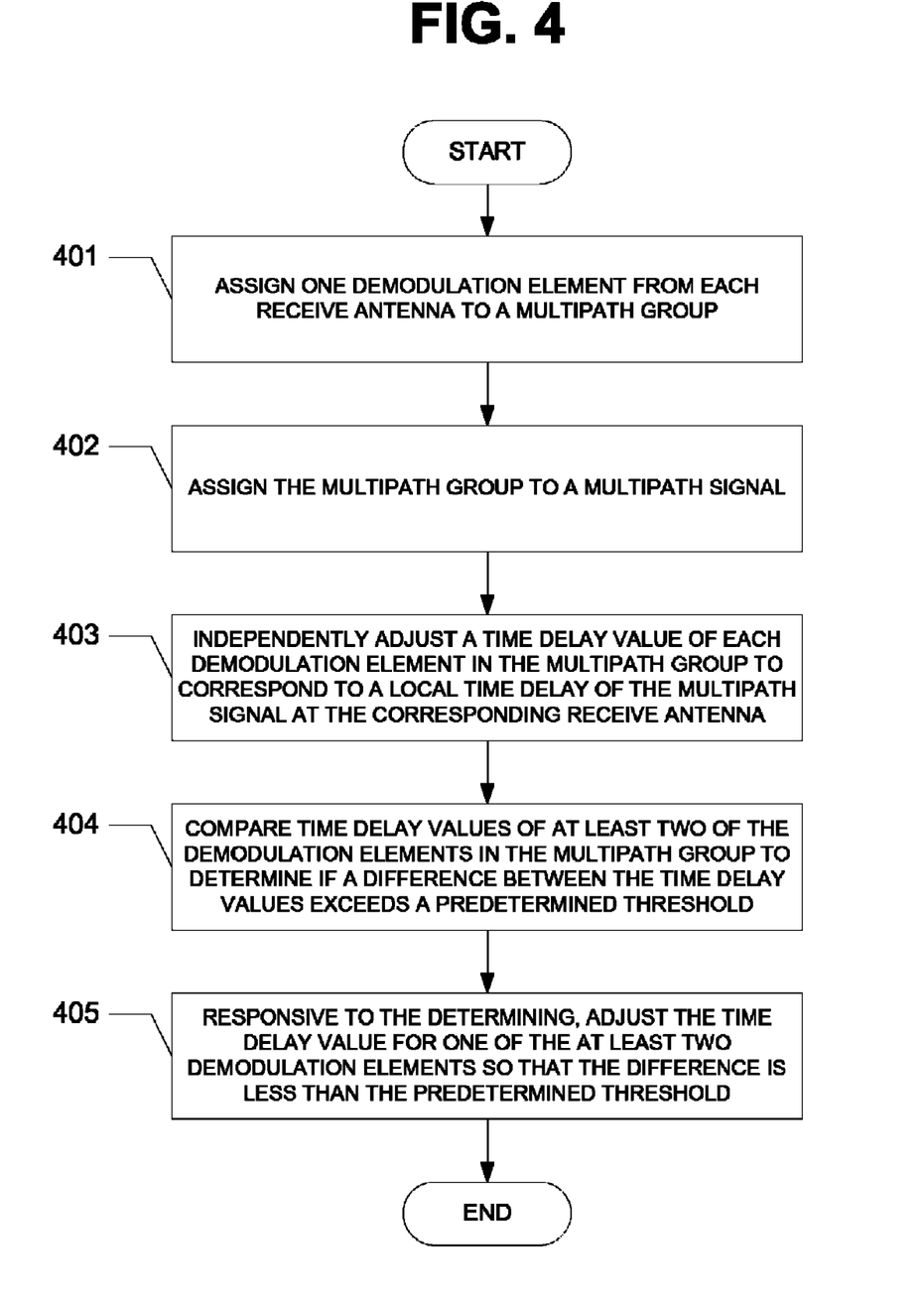
FIG. 4 is a flowchart illustrating a method of managing time-tracking for a rake receiver according to one aspect of the subject technology.

FIG. 4 is a flowchart illustrating a method of managing time-tracking for a rake receiver according to one aspect of the subject technology. The method begins with step 401, in which one demodulation element from each receive antenna in a rake receiver is assigned to a multipath group. In step 402, the multipath group is assigned by a searcher receiver of the rake receiver to a multipath signal (e.g., by setting a corresponding time delay value for each demodulation element in the multipath group). In step 403, the time delay value of each demodulation element in the multipath group is independently adjusted to correspond to a local time delay of the multipath signal at the corresponding receive antenna. In step 404, a processing system of the rake receiver compares the time delay values of at least two of the demodulation elements in the multipath group to determine if a difference therebetween exceeds a predetermined threshold. In step 405, if the difference exceeds the predetermined threshold, the time delay value for one of the at least two demodulation elements is adjusted so that the difference is less than the predetermined threshold (e.g., by either "bumping" or "slamming").

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The methods or algorithms described in connection with the configurations disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of machine-readable medium known in the art. A machine-readable medium may be coupled to the processor such that the processor can read information from, and write information to, the machine-readable medium. In the alternative, the machine-readable medium may be integral to the processor. The processor and the machine-readable medium may reside in an ASIC. The ASIC may reside in a rake receiver. In the alternative, the processor and the machine-readable medium may reside as discrete components in a rake receiver. A machine-readable medium may be a computer-readable medium encoded with a computer program.

Those of skill in the art would further appreciate that the various illustrative logical blocks, modules, circuits, elements, components, methods, and algorithms described herein may be implemented as electronic hardware, computer software, or combinations of both. To illustrate this interchangeability of hardware and software, various illustrative logical blocks, modules, circuits, elements, components, methods, and algorithms have been described above generally in terms of their functionality. Whether such functionality is implemented as hardware or software depends upon the particular application and design constraints imposed on the overall system. Furthermore, the functionality of one or more blocks may be performed by one block or distributed over many blocks or performed by another block. Skilled artisans may implement the described functionality in varying ways for each particular application.

A rake receiver can be any suitable communications device such as a cell phone, a wireless phone, a wired phone, a laptop computer, a desktop computer, a personal digital assistant (PDA), a data transceiver, a modem, a pager, a camera, a game console, an MPEG Audio Layer-3 (MP3) player, a media gateway system, an audio communications device, a video communications device, a multimedia communications device, a component of any of the foregoing devices (e.g., a printed circuit board(s), an integrated circuit(s), or a circuit component(s)), or any other suitable audio, video, or multimedia device, or a combination thereof.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include" or "have" is used in either the description or the claims, such term is intended to be inclusive in a manner similar to the term "comprising" as "comprising" is interpreted when employed as a transitional word in a claim.

What is claimed is:

1. A rake receiver, comprising:
a plurality of receive antennas, each receive antenna having a plurality of demodulation elements; and
a processing system configured to:
assign the plurality of demodulation elements from the plurality of receive antennas to a multipath group;
assign the multipath group to a multipath signal;
independently adjust a time delay value of each of the plurality of demodulation elements in the multipath group to correspond to a local time delay of the multipath signal at the corresponding receive antenna;
compare time delay values of at least two of the plurality of demodulation elements in the multipath group to determine if a difference between the time delay values exceeds a predetermined threshold, wherein the difference between the time delay values is increasing; and
in response to the determining, adjust the time delay value for one of the at least two of the plurality of demodulation elements so that the difference is less than the predetermined threshold.

2. The rake receiver of claim 1, wherein the processing system is configured to adjust the time delay value for the one of the at least two demodulation elements by setting the time delay value for the one of the at least two demodulation elements to a time delay value of another of the at least two demodulation elements in the multipath group.

3. The rake receiver of claim 1, wherein the processing system is configured to adjust the time delay value for the one of the at least two demodulation elements by incrementing the time delay value for the one of the at least two demodulation elements towards a time delay value of another of the at least two demodulation elements in the multipath group by a predetermined amount.

4. The rake receiver of claim 1, wherein the processing system is configured to select the one of the at least two demodulation elements to be adjusted based upon a relative signal strength between the at least two demodulation elements.

5. The rake receiver of claim 1, wherein the processing system is configured to adjust the time delay value for the one of the at least two demodulation elements without re-initializing the one of the at least two demodulation elements.

6. The rake receiver of claim 1, wherein the rake receiver comprises two receive antennas.

7. The rake receiver of claim 1, wherein the rake receiver comprises three receive antennas.

8. The rake receiver of claim 7, wherein the processing system is configured to:
compare time delay values of the three demodulation elements in the multipath group to determine if a difference between the time delay values of any two of the three demodulation elements exceeds a predetermined threshold; and in response to the determining, adjust the time delay value for one of the demodulation elements so that the difference is less than the predetermined threshold.

9. A rake receiver, comprising:
a plurality of receive antennas, each receive antenna having a plurality of demodulation elements; and
a processing system configured to:
assign one of the plurality of demodulation elements from each of the plurality of receive antennas to a multipath group;
assign the multipath group to a multipath signal;
independently adjust a time delay value of each of the plurality of demodulation elements element in the multipath group to correspond to a local time delay of the multipath signal at the corresponding receive antenna;
compare time delay values of at least two of the plurality of demodulation elements in the multipath group to determine if a difference between the time delay values exceeds a predetermined threshold, wherein the difference between the time delay values is increasing; and
in response to the determining, adjust the time delay value for one of the at least two of the plurality of demodulation elements so that the difference is less than the predetermined threshold.

10. The rake receiver of claim 9, wherein the processing system is configured to adjust the time delay value for the one of the at least two demodulation elements by setting the time delay value for the one of the at least two demodulation elements to a time delay value of another of the at least two demodulation elements in the multipath group.

11. The rake receiver of claim 9, wherein the processing system is configured to adjust the time delay value for the one of the at least two demodulation elements by incrementing the time delay value for the one of the at least two demodulation elements towards a time delay value of another of the at least two demodulation elements in the multipath group by a predetermined amount.

12. The rake receiver of claim 9, wherein the processing system is configured to select the one of the at least two demodulation elements to be adjusted based upon a relative signal strength between the at least two demodulation elements.

13. The rake receiver of claim 9, wherein the processing system is configured to adjust the time delay value for the one of the at least two demodulation elements without re-initializing the one of the at least two demodulation elements.

14. The rake receiver of claim 9, wherein the rake receiver comprises two receive antennas.

15. The rake receiver of claim 9, wherein the rake receiver comprises three receive antennas.

16. The rake receiver of claim 15, wherein the processing system is configured to:
   compare time delay values of the three demodulation elements in the multipath group to determine if a difference between the time delay values of any two of the three demodulation elements exceeds a predetermined threshold; and
   in response to the determining, adjust the time delay value for one of the demodulation elements so that the difference is less than the predetermined threshold.

17. A method of managing time-tracking for a rake receiver having a plurality of receive antennas, each receive antenna having a plurality of demodulation elements, the method comprising the steps of:
   assigning the plurality of demodulation elements from the plurality of receive antennas to a multipath group;
   assigning the multipath group to a multipath signal;
   independently adjusting a time delay value of each of the plurality of demodulation elements in the multipath group to correspond to a local time delay of the multipath signal at the corresponding receive antenna;
   comparing time delay values of at least two of the plurality of demodulation elements in the multipath group to determine if a difference between the time delay values exceeds a predetermined threshold, wherein the difference between the time delay values is increasing; and
   in response to the determining, adjusting the time delay value for one of the at least two of the plurality of demodulation elements so that the difference is less than the predetermined threshold.

18. The method of claim 17, wherein the adjusting the time delay value for the one of the at least two demodulation elements includes setting the time delay value for the one of the at least two demodulation elements to a time delay value of another of the at least two demodulation elements in the multipath group.

19. The method of claim 17, wherein the adjusting the time delay value for the one of the at least two demodulation elements includes incrementing the time delay value for the one of the at least two demodulation elements towards a time delay value of another of the at least two demodulation elements in the multipath group by a predetermined amount.

20. The method of claim 17, wherein the adjusting the time delay value for the one of the at least two demodulation elements includes selecting the one of the at least two demodulation elements to be adjusted based upon a relative signal strength between the at least two demodulation elements.

21. The method of claim 17, wherein the time delay value for the one of the at least two demodulation elements is adjusted without re-initializing the one of the at least two demodulation elements.

22. The method of claim 17, wherein the rake receiver comprises two receive antennas.

23. The method of claim 17, wherein the rake receiver comprises three receive antennas.

24. The method of claim 23, wherein:
   the comparing step comprises comparing time delay values of the three demodulation elements in the multipath group to determine if a difference between the time delay values of any two of the three demodulation elements exceeds a predetermined threshold; and
   the adjusting step comprises adjusting, in response to the determining, the time delay value for one of the demodulation elements so that the difference is less than the predetermined threshold.

25. A receiver system comprising:
   a plurality of receive antennas, each receive antenna having a plurality of demodulation elements;
   means for assigning the plurality of demodulation elements from the plurality of receive antennas to a multipath group;
   means for assigning the multipath group to a multipath signal; and
   means for independently adjusting a time delay value of each of the plurality of demodulation elements in the multipath group to correspond to a local time delay of the multipath signal at the corresponding receive antenna;
   means for comparing time delay values of at least two of the plurality of demodulation elements in the multipath group to determine if a difference between the time delay values exceeds a predetermined threshold, wherein the difference between the time delay values is increasing; and
   means for adjusting, in response to the determining, the time delay value for one of the at least two of the plurality of demodulation elements so that the difference is less than the predetermined threshold.

26. The receiver system of claim 25, wherein the means for adjusting the time delay value for the one of the at least two demodulation elements are configured to set the time delay value for the one of the at least two demodulation elements to a time delay value of another of the at least two demodulation elements in the multipath group.

27. The receiver system of claim 25, wherein the means for adjusting the time delay value for the one of the at least two demodulation elements is configured to increment the time delay value for the one of the at least two demodulation elements towards a time delay value of another of the at least two demodulation elements in the multipath group by a predetermined amount.

28. The receiver system of claim 25, wherein means for adjusting the time delay value for the one of the at least two demodulation elements is configured to select the one of the at least two demodulation elements to be adjusted based upon a relative signal strength between the at least two demodulation elements.

29. The receiver system of claim 25, wherein the means for adjusting the time delay value for the one of the at least two demodulation elements is configured to adjust the time delay value for the one of the at least two demodulation elements without re-initializing the one of the at least two demodulation elements.

30. The receiver system of claim 25, wherein the receiver system comprises two receive antennas.

31. The receiver system of claim 25, wherein the receiver system comprises three receive antennas.

32. The receiver system of claim 31, further comprising:
   means for comparing time delay values of the three demodulation elements in the multipath group to determine if a difference between the time delay values of any two of the three demodulation elements exceeds a predetermined threshold; and means for adjusting, in response to the determining, the time delay value for one of the demodulation elements so that the difference is less than the predetermined threshold.

33. A non-transitory machine-readable medium embodying a method for managing time-tracking for a rake receiver having a plurality of receive antennas, each receive antenna having a plurality of demodulation elements, the method comprising the steps of:
assigning the plurality of demodulation elements from the plurality of receive antennas to a multipath group;
assigning the multipath group to a multipath signal; independently adjusting a time delay value of each of the plurality of demodulation element in the multipath group to correspond to a local time delay of the multipath signal at the corresponding receive antenna;
comparing time delay values of at least two of the plurality of demodulation elements in the multipath group to determine if a difference between the time delay values exceeds a predetermined threshold, wherein the difference between the time delay values is increasing; and
in response to the determining, adjusting the time delay value for one of the at least two of the plurality of demodulation elements so that the difference is less than the predetermined threshold.

34. The non-transitory machine-readable medium of claim 33, wherein the adjusting the time delay value for the one of the at least two demodulation elements includes setting the time delay value for the one of the at least two demodulation elements to a time delay value of another of the at least two demodulation elements in the multipath group.

35. The non-transitory machine-readable medium of claim 33, wherein the adjusting the time delay value for the one of the at least two demodulation elements includes incrementing the time delay value for the one of the at least two demodulation elements towards a time delay value of another of the at least two demodulation elements in the multipath group by a predetermined amount.

36. The non-transitory machine-readable medium of claim 33, wherein the adjusting the time delay value for the one of the at least two demodulation elements includes selecting the one of the at least two demodulation elements to be adjusted based upon a relative signal strength between the at least two demodulation elements.

37. The non-transitory machine-readable medium of claim 33, wherein the time delay value for the one of the at least two demodulation elements is adjusted without re-initializing the one of the at least two demodulation elements.

38. The non-transitory machine-readable medium of claim 33, wherein the rake receiver comprises two receive antennas.

39. The non-transitory machine-readable medium of claim 33, wherein the rake receiver comprises three receive antennas.

40. The non-transitory machine-readable medium of claim 39, wherein:
the comparing step comprises comparing time delay values of the three demodulation elements in the multipath group to determine if a difference between the time delay values of any two of the three demodulation elements exceeds a predetermined threshold; and
the adjusting step comprises adjusting, in response to the determining, the time delay value for one of the demodulation elements so that the difference is less than the predetermined threshold.

* * * * *